Patented Feb. 13, 1945

2,369,537

UNITED STATES PATENT OFFICE 2,369,537

METHOD FOR BRAZING

Thomas G. Crawford, Glenville, N. Y., assignor to General Electric Company, a corporation of New York No Drawing. Application May 16, 1942, Serial No. 443,283

3 Claims. (Cl. 113—112)

The present invention is a method for brazing. Heretofore in copper brazing metal structures it has been customary to carefully machine the parts to be joined so as to make a very tight fit between the parts to be brazed; in other words, to fit the opposing surfaces together so that only a capillary opening exists between them. In joining metal structures with solder, in order to secure the best results, it also has been customary to assemble the structures to be joined so that a definite space, for example about two or three thousandths of an inch, exists between the surfaces to be joined.

Each of these prior processes requires that the surfaces of the metals to be joined should be clean and free from oxide and scale and that there be a definite space between the surfaces to be joined. As a result such surfaces are usually subjected to careful machining or grinding operations so that the parts to be joined may be more or less accurately fitted together.

It is one of the objects of the present invention to provide a metal brazing process which avoids the necessity of securing an exact fit between the parts to be joined.

In carrying out my invention I provide a foundation metal with a metal coating which, if desired, may be secured readily to another metal structure, or I may join two metal bodies, such as nickel and tungsten. The tungsten, for example, may be in the shape of a rod and the nickel may be provided with an opening in which the tungsten rod fits quite loosely.

In the operation of my improved process the tungsten is oxidized in any suitable manner, for example by heating in an oxidizing flame to thereby produce an oxide layer on the tungsten rod. The thickness of the oxide layer depends on the material being used but it never should be carried out to the extent that it becomes flaky. The oxide coating is removed by brushing or other suitable means from that portion of the tungsten rod which is not to be brazed or coated and the remaining oxide coated portion of the tungsten rod inserted in the opening in the nickel block. A ring of copper is positioned on the tungsten rod at the mouth in the opening of the nickel block and the assembled structure heated in an atmosphere free from oxygen, for example in hydrogen or other suitable reducing gas and at a temperature high enough to reduce the oxide and melt the copper. When that temperature is attained the copper will run on the tungsten in a manner similar to oil running in a wick and fill the space between the opposing surfaces of tungsten and nickel. Apparently the oxide coating on the foundation metal is of such thickness that when the oxide is reduced a spongy surface with capillary openings is provided in which the brazing metal flows in a manner similar to that which occurs in copper brazing where the parts to be joined are tightly fitted together with only a capillary opening between them.

In carrying out my process the parts to be joined do not have to be fitted together with precision; in fact, to obtain the best results they should fit quite loosely, the space between the surfaces to be joined being considerably greater than a capillary opening. I have found that a particularly good junction may be obtained when the spacing between the surfaces to be joined is about .010 inch.

While my improved process is particularly advantageous for use in brazing or soldering together metal structures, it also may be employed in applying a metal coating to a foundation metal. For example, if it is desired to apply a metal coating such as copper to a tungsten rod the portion of the rod to be coated is oxidized in any suitable manner and the copper is applied to the oxide surface of the tungsten or at a point closely adjacent to that surface. When the assembled structure is heated in a reducing atmosphere at a temperature high enough to reduce the oxide and melt the copper the latter will run on or wet the reduced oxide surface. Thereafter, if desired, the coated metal may be brazed to another metal.

Although I have illustrated my invention in connection with coating tungsten with copper and joining tungsten and nickel, my invention is not limited to these metals. I have coated steel with steel, employing copper as the brazing metal. I have also employed my improved process in coating steel with silver and in brazing the coated metal to other metals.

What I claim as new and desire to secure by Letters Patent of the United States is:

1. The method of brazing two structures which comprises providing one of said structures with an oxide coating of such thickness that when the oxide is reduced a spongy surface with capillary openings is provided, assembling the structures so that the space between the oxidized surface and the adjacent surface on said other structure is appreciably greater than a capillary opening, positioning brazing metal on or closely adjacent to the surfaces to be brazed and then heating said structures to a temperature high enough to reduce the oxide and melt the brazing metal, the reduction of said oxide forming said spongy surface having capillary openings.

2. The method of brazing two structures which comprises providing one of them with an oxide coating of such thickness that when the oxide coating is reduced a spongy surface with capillary openings is provided, assembling the structures so that the space between the oxidized surface and the adjacent surface on the other structure is of the order of one hundredth of an inch, positioning brazing metal on or closely adjacent to the surfaces to be brazed and then heating said structures in a reducing atmosphere at a temperature high enough to reduce the oxide and melt the brazing metal, the reduction of said oxide forming said spongy surface having capillary openings.

3. The method of brazing two structures one of which has an opening therein and within which said second structure is loosely positioned so that the distance between the structures is of the order of one hundredth of an inch, said method comprising providing one of the opposing surfaces of said structures with an oxide coating of such thickness that when the oxide coating is reduced a spongy surface with capillary openings is provided and applying brazing metal to said oxidized surface while it is heated in a hydrogen atmosphere at a temperature high enough to reduce said oxide, melt the brazing metal and thereby effect a junction between said structures, the reduction of said oxide forming said spongy surface having capillary openings.

THOMAS G. CRAWFORD.